United States Patent
McArdle et al.

(10) Patent No.: US 9,609,135 B2
(45) Date of Patent: Mar. 28, 2017

(54) DAY-LEVEL SLA-BASED ROUTING

(71) Applicant: NewVoiceMedia, Ltd., Basingstoke, Hampshire (GB)

(72) Inventors: Christian McArdle, Reading (GB); Tom Fairweather, Basingstoke (GB); Jonathan Alexander Wade, Bath (GB); James Swinhoe, Newbury (GB)

(73) Assignee: NEWVOICEMEDIA LIMITED, Basingstoke (GB)

( * ) Notice: Subject to any disclaimer, the term of this patent is extended or adjusted under 35 U.S.C. 154(b) by 0 days.

(21) Appl. No.: 15/099,583

(22) Filed: Apr. 14, 2016

(65) Prior Publication Data

US 2016/0219151 A1    Jul. 28, 2016

Related U.S. Application Data

(63) Continuation-in-part of application No. 14/754,459, filed on Jun. 29, 2015, now Pat. No. 9,338,299, which is a continuation of application No. 13/835,933, filed on Mar. 15, 2013, now Pat. No. 9,071,547, which is a continuation-in-part of application No. 13/550,587, filed on Jul. 16, 2012, now Pat. No. 8,463,939.

(60) Provisional application No. 62/293,311, filed on Feb. 9, 2016, provisional application No. 61/607,909, filed on Mar. 7, 2012.

(51) Int. Cl.
*H04M 3/00* (2006.01)
*H04M 5/00* (2006.01)
*H04M 3/523* (2006.01)
*G06Q 30/00* (2012.01)
*H04M 3/51* (2006.01)
*H04L 12/721* (2013.01)

(52) U.S. Cl.
CPC .......... *H04M 3/5235* (2013.01); *G06Q 30/01* (2013.01); *H04L 45/44* (2013.01); *H04M 3/5183* (2013.01); *H04M 3/5232* (2013.01); *H04M 3/5238* (2013.01)

(58) Field of Classification Search
CPC ............. H04M 3/5235; H04M 3/5232; H04M 3/5238; H04M 3/5191; H04M 3/5183; H04L 45/44; G06Q 30/01
USPC ............. 379/265.01–265.14, 266.01–266.06; 709/226, 231, 235, 238
See application file for complete search history.

(56) References Cited

U.S. PATENT DOCUMENTS

| | | | |
|---|---|---|---|
| 2011/0182418 A1* | 7/2011 | Anisimov | ............... H04L 29/06 379/265.01 |
| 2012/0134487 A1 | 5/2012 | Flockhart et al. | |
| 2014/0376710 A1 | 12/2014 | Shaffer et al. | |

\* cited by examiner

*Primary Examiner* — Quynh Nguyen
(74) *Attorney, Agent, or Firm* — Galvin Patent Law LLC; Brian R. Galvin (57) ABSTRACT

A system for day-level SLA-based routing, comprising a statistics server configured to collect, store, and provide service level agreement data; and a routing server configured to receive at least a customer interaction via a network, and configured to compare an interaction against service level agreement data provided by the statistics server, and configured to produce an interaction priority based at least in part on the comparison, and configured to route the interaction based at least in part on the interaction priority.

4 Claims, 8 Drawing Sheets

DAY-LEVEL SLA-BASED ROUTING

CROSS-REFERENCE TO RELATED APPLICATIONS

This application claims the benefit of, and priority to, 62/293,311, titled "DAY-LEVEL SLA-BASED ROUTING" and filed on Feb. 9, 2016, the entire specification of which is incorporated herein by reference in its entirety. This application is also a continuation-in-part of U.S. patent application Ser. No. 14/754,459, titled "DISTRIBUTED CONSTRAINT-BASED OPTIMIZED ROUTING OF INTERACTIONS", which was filed on Jun. 29, 2015, which is a continuation of U.S. patent application Ser. No. 13/835,933, now issued as U.S. Pat. No. 9,071,547 on Jun. 30, 2015, and titled "DISTRIBUTED CONTRAINT-BASED OPTIMIZED ROUTING OF INTERACTIONS," filed on Mar. 15, 2013, and is also a continuation-in-part of U.S. patent application Ser. No. 13/550,587, now issued as U.S. Pat. No. 8,463,939 on Jun. 11, 2013, titled "SYSTEM AND METHOD FOR OPTIMIZED AND DISTRIBUTED ROUTING OF INTERACTIONS", which was filed on Jul. 16, 2012 and claims priority to U.S. provisional patent application Ser. No. 61/607,909, titled "SYSTEM AND METHOD FOR OPTIMIZED AND DISTRIBUTED ROUTING OF INTERACTIONS," which was filed on Mar. 7, 2012, which is a continuation-in-part of U.S. patent application Ser. No. 13/602,048, now issued as U.S. Pat. No. 8,386,639, issued on Feb. 26, 2013, titled "SYSTEM AND METHOD FOR OPTIMIZED AND DISTRIBUTED RESOURCE MANAGEMENT" and filed on Aug. 31, 2012, which claims priority to U.S. provisional patent application Ser. No. 61/672,240, titled 'SYSTEM AND METHOD FOR OPTIMIZED AND DISTRIBUTED RESOURCE MANAGEMENT, which was filed on Jul. 16, 2012, which is a continuation-in-part of abandoned U.S. patent application Ser. No. 13/357,502, titled "SYSTEM AND METHOD FOR CONDUCTING REAL-TIME AND HISTORICAL ANALYSIS OF COMPLEX CUSTOMER CARE PROCESSES", filed on Jan. 24, 2012, the entire specification of each of which is incorporated in its entirety herein by reference.

BACKGROUND OF THE INVENTION

Field of the Art

The disclosure relates to the field of contact center operations, and more particularly to the field of interaction routing optimization within a contact center environment.

Discussion of the State of the Art

In the field of contact center operations, routing interactions is generally handled according to agent skills, which may or may not correspond to actual skills or training and function as a manual shorthand for routing configurations. For example, what calls are routed to a particular agent may be modified by adding or removing skills, effectively enabling and preventing them from receiving specific types or classes of interaction. This approach is very labor-intensive, requiring constant manual monitoring and interaction, and has no direct correlation with actual contact center performance or meaningful statistics. Contact centers operate on service level agreements, wherein they contract with a client to meet specific levels of service such as agreeing that 80% of the client's calls will be answered within a given timeframe. These service levels may not be visible to personnel in charge of routing calls, and they are not tracked on a short-term basis to optimize call routing with fine granularity.

What is needed, is a means to track and record service level performance for interactions, and to automatically adjust routing policies to meet service levels in an ideal fashion without requiring manual intervention and without requiring modification of individual agent configurations.

SUMMARY OF THE INVENTION

Accordingly, the inventor has conceived and reduced to practice, in a preferred embodiment of the invention, a system and method for day-level SLA-based routing, that enables short-term data analysis to drive routing policies for optimal SLA compliance.

According to a preferred embodiment of the invention, a system for day-level SLA-based routing, comprising a statistics server computer comprising at least a processor, a memory, and a plurality of programming instructions stored in its memory and operating on its processor and configured to receive event data regarding interactions received at a contact center and to provide day-level service level compliance data for each of a plurality of interaction types based on the received event data; and a routing server computer comprising at least a processor, a memory, and a plurality of programming instructions stored in its memory and operating on its processor and configured to: receive an interaction via a network; determine an interaction type for the interaction; retrieve day-level service level agreement compliance data for each interaction type from the statistics server; establish a priority for the interaction at least by comparing the day-level service agreement compliance data for the determined interaction type to the day-level service agreement compliance data for each interaction type from the plurality of interaction types other than the determined interaction type; and route the interaction based at least in part on the established priority for the interaction, is disclosed.

According to another preferred embodiment of the invention, a method for day-level SLA-based routing, comprising the steps of: receiving, at a routing server comprising at least a plurality of programming instructions stored in a memory and operating on a processor of a network-connected computing device and configured to receive at least a customer interaction via a network, and configured to compare an interaction against known service level agreement data provided by the statistics server, and configured to produce an interaction priority based at least in part on the comparison, and configured to route the interaction based at least in part on the interaction priority, an interaction; determining the interaction's type; comparing the interaction to service level agreement data provided by a statistics server comprising at least a plurality of programming instructions stored in a memory and operating on a processor of a network-connected computing device and configured to collect, store, and provide service level agreement data; determining an interaction priority based at least in part on the comparison; and routing the interaction based at least in part on the interaction priority, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

The inventor has conceived, and reduced to practice, in a preferred embodiment of the invention, a system and method for day-level SLA-based routing, that enables short-term data analysis to drive routing policies for optimal SLA compliance.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

Figure 1:
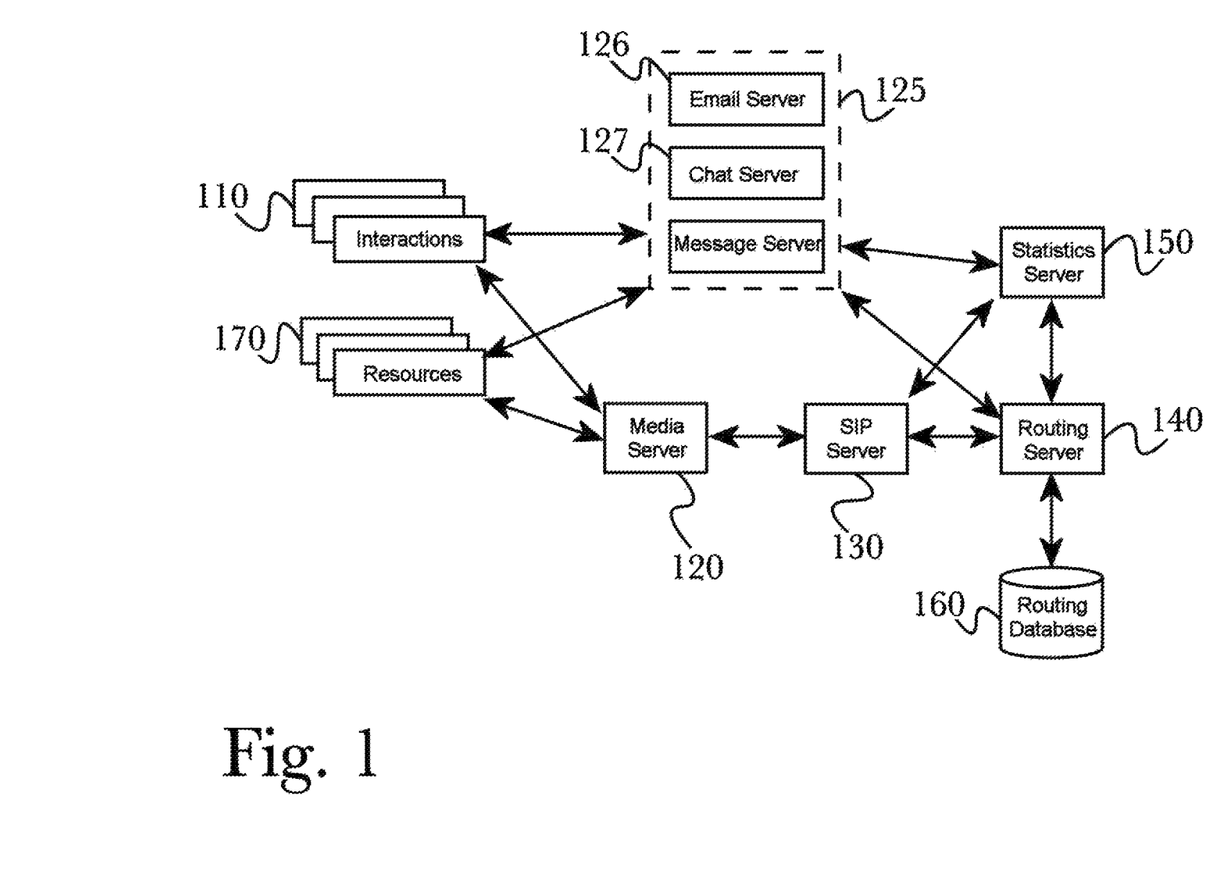
FIG. 1 is a block diagram of an exemplary architecture for a contact center.

FIG. 1 is a block diagram of an exemplary architecture for a contact center. According to the embodiment, a plurality of interactions 110 are delivered to, or initiated outward from, media server 120. In some embodiments where a single medium (such as ordinary telephone calls) is used for interactions that require routing, media server 120 may be more specifically a private branch exchange (PBX), automated call distributor (ACD), or similar media-specific switching system. Generally, when interactions arrive at media server 120, a route request, or a variation of a route request (for example, a SIP invite message), is sent to session initiation protocol SIP server 130, or to an equivalent system such as a computer telephony integration (CTI) server 130. A route request is a data message sent from a media-handling device such as media server 120 to a signaling system such as SIP server 130, the message comprising a request for one or more target destinations to which to send (or route, or deliver) the specific interaction with regard to which the route request was sent. SIP server 130 or its equivalent may, in some embodiments, carry out any required routing logic itself, or it may forward the route request message to routing server 140. Routing server 140 executes, using statistical data from statistics server 150 and (at least optionally) data from routing database 160, a routing script in response to the route request message and sends a response to media server 120 directing it to route the interaction to a specific target resource. In a preferred embodiment, routing server 140 uses historical or real time information, or both, from statistics server 150, as well as configuration information (generally available from a distributed configuration system, not shown for convenience) and information from routing database 160. Statistics server 150 receives event notifications from media server 120 or SIP server 130 (or both) regarding events pertaining to a plurality of specific interactions handled by media server 120 or SIP server 130 (or both), and statistics server 150 computes one or more statistics for use in routing based on the received event notifications. Routing database 160 may of course be comprised of multiple distinct databases, either stored in one database management system or in separate database management systems. Examples of data that may normally be found in routing database 160 may include (but are not limited to): customer relationship management (CRM) data; data pertaining to one or more social networks (including, but not limited to network graphs capturing social relationships within relevant social networks, or media updates made by members of relevant social networks); skills data pertaining to a plurality of resources 170 (which may be human agents, automated software agents, interactive voice response scripts, and so forth); data extracted from third party data sources including cloud-based data sources such as CRM and other data from Salesforce.com, credit data from Experian, consumer data from data.com; or any other data that may be useful in making routing decisions. It will be appreciated by one having ordinary skill in the art that there are many means of data integration known in the art, any of which may be used to obtain data from premise-based, single machine-based, cloud-based, public or private data sources as needed, without departing from the scope of the invention. Using information obtained from one or more of statistics server 150, routing database 160, and any associated configuration systems, routing server 140 selects a routing target from among a plurality of available resources 170, and routing server 140 then instructs SIP server 130 to route the interaction in question to the selected resource 170, and SIP server 130 in turn directs media server 120 to establish an appropriate connection between interaction 110 and target resource 170. According to an embodiment, the routing script comprises at least the steps of generating a list of all possible routing targets for the interaction regardless of the real-time state of the routing targets using at least an interaction identifier and a plurality of data elements pertaining to the interaction, removing a subset of routing targets from the generated list based on the subset of routing targets being logged out to obtain a modified list, computing a plurality of fitness parameters for each routing target in the modified list, sorting the modified list based on one or more of the fitness parameters using a sorting rule to obtain a sorted target list, and using a target selection rule to consider a plurality of routing targets starting at the beginning of the sorted target list until a routing target is selected. It should be noted that interactions 110 are generally, but not necessarily, associated with human customers or users. Nevertheless, it should be understood that routing of other work or interaction types is possible, according to the present invention. For example, in some embodiments work items, such as loan applications that require processing, are extracted from a work item backlog or other source and routed by a routing server 140 to an appropriate human or automated resource to be handled.

SLA-based routing may be used to optimize the wait times of groups of interactions that may pertain to or affect service levels, such as sales calls or tech support sessions, where it is common to have an agreed-upon level of customer satisfaction or CSAT, or a threshold of "first-call issue resolution", or similar service levels. Each group of interactions may, for example, have a target answer time and a percentage of interactions that should be routed within that target time (for example, "80% routed within two minutes"). Interaction type data may be collected as interactions are routed by a routing server 140, and this data may be used to determine how well the interaction or group of interactions is doing compared with its targets. If a target is not being met, then an interaction or group may be given more priority than another group where the target is being met (that is, additional focus may be placed on interactions that are lagging behind service level targets).

Interactions may be grouped into "agreements" using one or more metrics, such as agent skills or interaction statistics (for example, handle time, number of sales completed, number of transfers, or other measurable information for a particular interaction). For example, an agreement called "French Customer Service" could be specified with both "Customer Service" and "French" skills. When an interaction tagged with these skills is routed by routing server 140, routing server 140 remembers whether the interaction hit its target. By defining several agreements in this manner it becomes possible to automate complex routing decisions so that they match with service level priorities. For example, this could involve making sure that preferred customers (for example, high-spend accounts or accounts over a longevity threshold) always get a very prompt response, whereas people calling for their own sales (for example, an outbound sales center dialing into an inbound customer service center) may be de-prioritized. Performance data for an agreement may then be removed after a period of time, giving a short-term or "rolling" dataset. According to a preferred embodiment, a short-term dataset may cover a "per-day" time range, generally either an actual 24-hour period of operation (as may be useful for 24-hour contact centers), or encompassing a specified work shift period such as an 8- or 9-hour period during peak hours.

Another exemplary arrangement may utilize SLA-based routing across multiple clients within a multi-tenant contact center. In a multi-tenant contact center, multiple corporations or other entities (the "clients") may be allocated portions of a contact center's resources such as agents, communication ports, or even specific server resources such as disk space or processor time (for example, one client may be allowed to utilize x amount of disk space for call recordings or other log data). Using SLA-based routing, these resource allocations may be updated within a small timeframe in response to service levels, for example by allocating more resources to a client when service levels are not being met (to provide a "boost" to bring the numbers within the agreed-upon range), at the expense of resources previously allocated to a client whose SLA is being met. When possible, this may even include reallocating contact center agents through the use of scheduling and queuing, for example by altering a particular agent's assigned "skill sets" so that they begin receiving more interactions for a client (taking into considering whether the agent is indeed trained or otherwise suited to handle the interactions).

A further exemplary use case may involve the use of SLA-based routing across multiple contact centers, each of which may or may not utilize multi-tenant SLA-based routing as described above. For example, multiple contact centers handling interactions for similar clients may be grouped into an "SLA adherence group", and interactions may be routed based on service level information not only within an individual contact center, but within an SLA adherence group as a whole. For example, if one contact center within a group has high service level statistics while another is lagging behind, and the SLA adherence group overall is falling of the agreed-upon threshold, more interactions may be preferentially routed to the contact center with higher numbers to provide the needed boost to the adherence metrics. This may also be used to incentivize performance within individual contact centers, as higher performance may be equated to more interactions, which in turn results in more revenue for their center (particularly in cases of multi-tenant contact centers that depend on client contracts for revenue).

Figure 2:
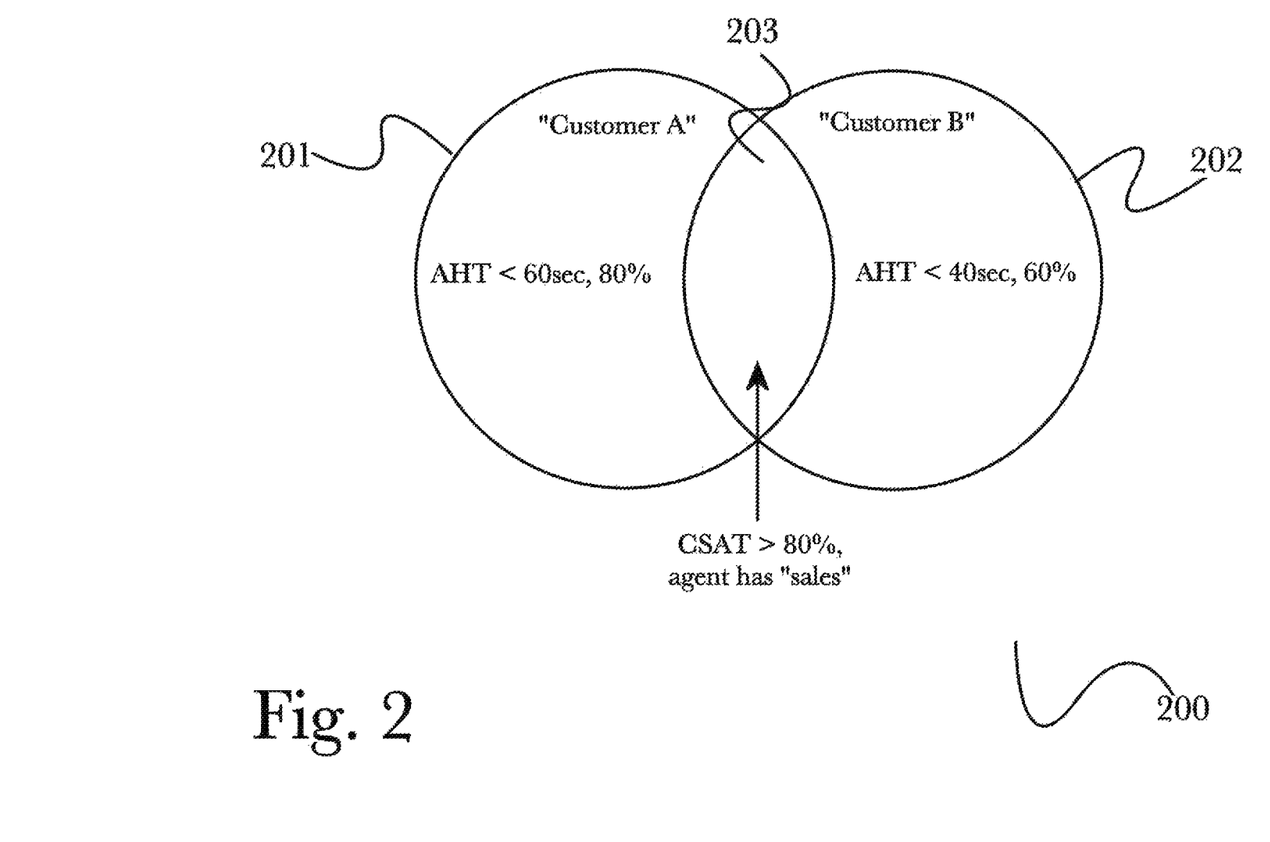
FIG. 2 is a Venn diagram illustrating exemplary relationships between multiple service level agreements.

FIG. 2 is a Venn diagram 200 illustrating exemplary relationships between multiple service level agreements. As illustrated, a particular service level agreement 201 for one contact center client may specify a number of target service levels, such as "at least 80% of calls are answered within 60 seconds", as well as required agent skills such as "sales". A second SLA for another client 202 may specify its own set of targets and skills, for example "at least 60% of calls are answered within 40 seconds", and requiring the "sales" skill. In the exemplary relationship, these two SLAs have some overlap 203, as they both require agents with the "sales" skill, however they have different targets for handle time. Using this information, calls may be routed optimally to satisfy both agreements based on current short-term data results from analysis of recent interactions. For example, short-term data analysis may show that so far during the current period (such as a work shift or a calendar day) more than 80% of calls for "Customer A" have been answered within 60 seconds (thereby meeting the agreed-upon service level), but only 20% of "Customer B" calls have been answered within 40 seconds. Based on this information, new interactions for "Customer B" may be prioritized to boost their SLA compliance ratings (by giving them routing priority and therefore decreasing the wait time to be answered), while calls for "Customer A" may be de-prioritized as the SLA is being met, effectively "making room" for the routing of prioritized calls by allowing these calls to wait longer. In this manner, interaction types and SLA compliance may be monitored and used to update routing behavior in real-time, to achieve optimum compliance with all agreements within a specified timeframe (such as per-day or per-shift).

DETAILED DESCRIPTION OF EXEMPLARY EMBODIMENTS

Figure 3:
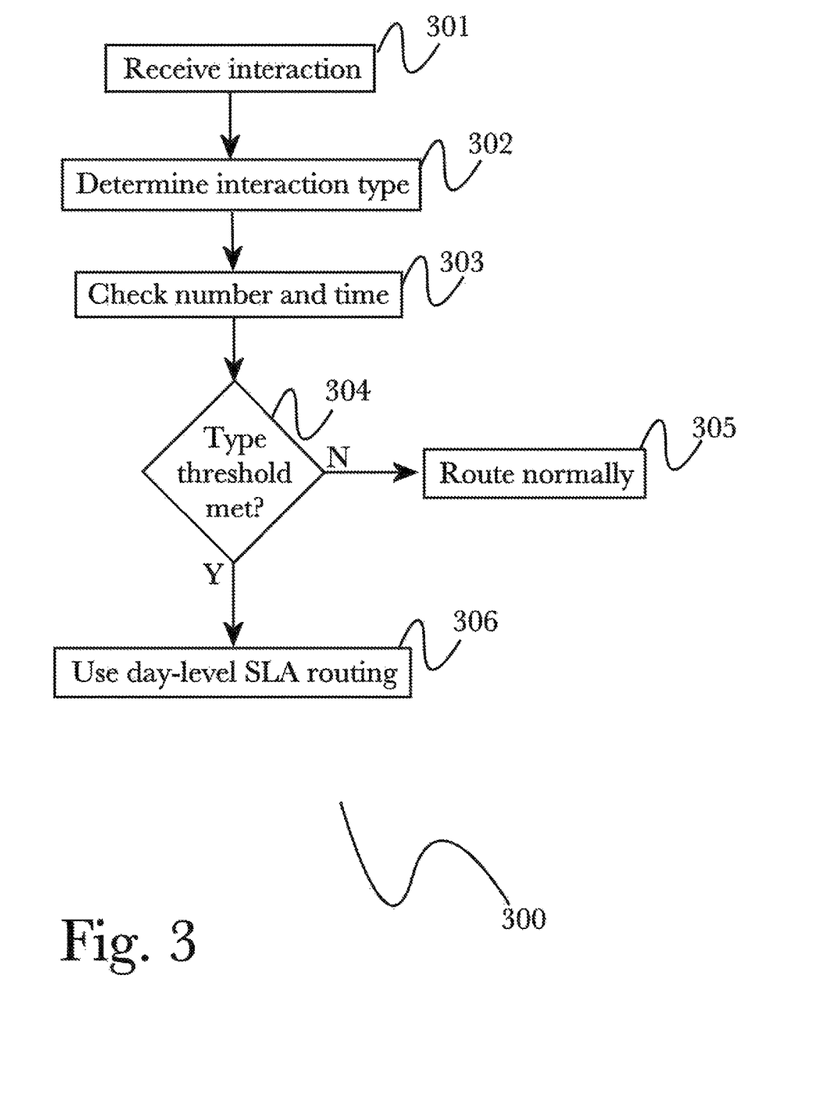
FIG. 3 is a flow diagram illustrating an exemplary method for day-level SLA-based routing, according to a preferred embodiment of the invention.

FIG. 3 is a flow diagram illustrating an exemplary method 300 for day-level SLA-based routing, according to a preferred embodiment of the invention. In an initial step 301, a routing server 140 may receive an interaction, such as an inbound telephone call, chat session, email, or other interaction type. Routing server 140 may then identify the interaction's type 302, for example "sales call" or "account services", for example based on information received from an interactive voice response (IVR) system providing the interaction, or based on known or inferred interaction-specific metadata. For example, a customer calling in may select their call purpose via an IVR and this information may be passed to routing server 140 for handling, or a customer that has called recently may be calling to follow-up on their previous interaction, and this information may be identified based on historical records of prior interactions in routing database 160. In a next step 303, routing server 140 may use this interaction type information to check the number of interactions received so far during the current day (or shift, or other configured timeframe for SLA-based routing), as well as the current or elapsed time when the interaction was received. Based on this information, routing server 140 may determine whether a configured interaction type threshold has been met 304, for example "100 sales calls or two hours of calls" or other configuration thresholds for interaction types, as may be stored in routing database 160. If a configured threshold has not been met, the interaction may be routed normally 305 and operation continues for additional interactions. This enables a "calibration window" based on quantity of interactions of a particular type, or based on length of "uptime" spent receiving interactions, or both, in various combinations. Additionally, an interaction may have multiple types, such as "sales call", "French-speaking", and "high-value customer", each of which or any combination of which may have configured thresholds (for example, "25 French sales calls or two hours of calls in the French-speaking queue"). If any threshold is met for a particular interaction, routing server 140 may utilize SLA-based routing logic 306 (described in greater detail below, referring to FIG. 4), instead of traditional, simple routing 305 (such as routing to a contact center agent with the longest wait time, or similar routing strategies common in the art).

Figure 4:
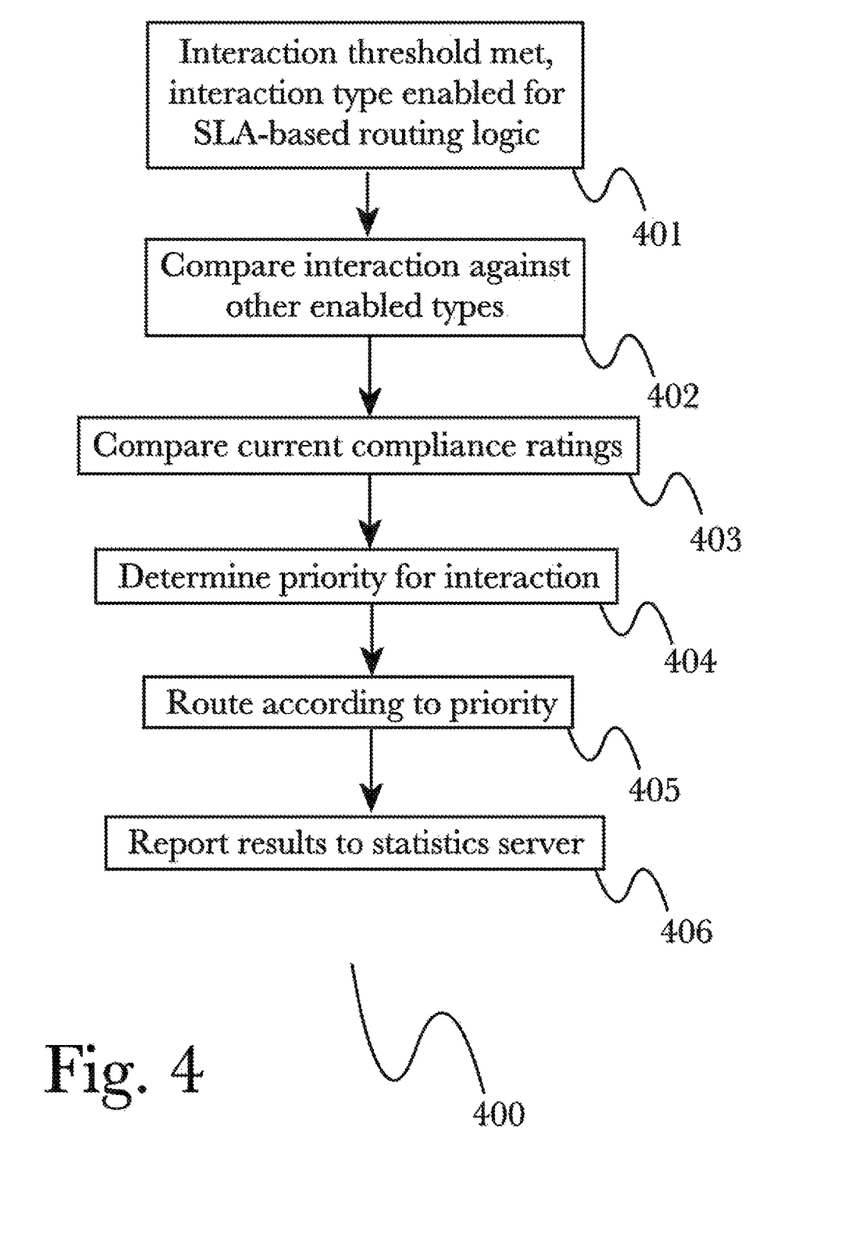
FIG. 4 is a flow diagram illustrating an exemplary method for day-level SLA-based routing, according to a preferred embodiment of the invention.

FIG. 4 is a flow diagram illustrating an exemplary method 400 for day-level SLA-based routing, according to a preferred embodiment of the invention. In an initial step 401, a routing server 140 may receive an interaction for which a configured routing threshold has been met, and for which SLA-based routing is enabled (that is, the interaction or interaction type has been configured for use in SLA-based routing behavior according to the embodiment, as may be stored in a routing database 160). Routing server 140 may then compare the interaction against other interaction types that have been enabled for SLA-based routing 402, and may compare current compliance ratings for enabled interaction types 403 as may be provided by a statistics server 150. Based at least in part on these compliance ratings among enabled interaction types (representing each interaction type's current compliance level with various service level agreements), a priority for the current interaction may be determined 404. It should also be appreciated that any particular interaction or interaction type may have multiple compliance ratings, for example for an interaction that has multiple types or an interaction type that is involved in multiple service level agreements. In a next step 405, based at least in part on a determined interaction priority from a previous step 404, the interaction may be routed. For example, a high-priority interaction may "cut in line" and be routed ahead of other interactions that were waiting in a queue, or a low priority interaction may be allowed to wait longer while others are routed, and other such routing policies that may utilize per-interaction priority-based routing behavior. In a final step 406, results may be reported to statistics server 150, such as the results of interaction comparison, interaction priorities, or the routing outcome of a particular interaction such as how long it had to wait for resolution, which may be used by statistics server 150 in the determination of future compliance ratings or other statistics.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
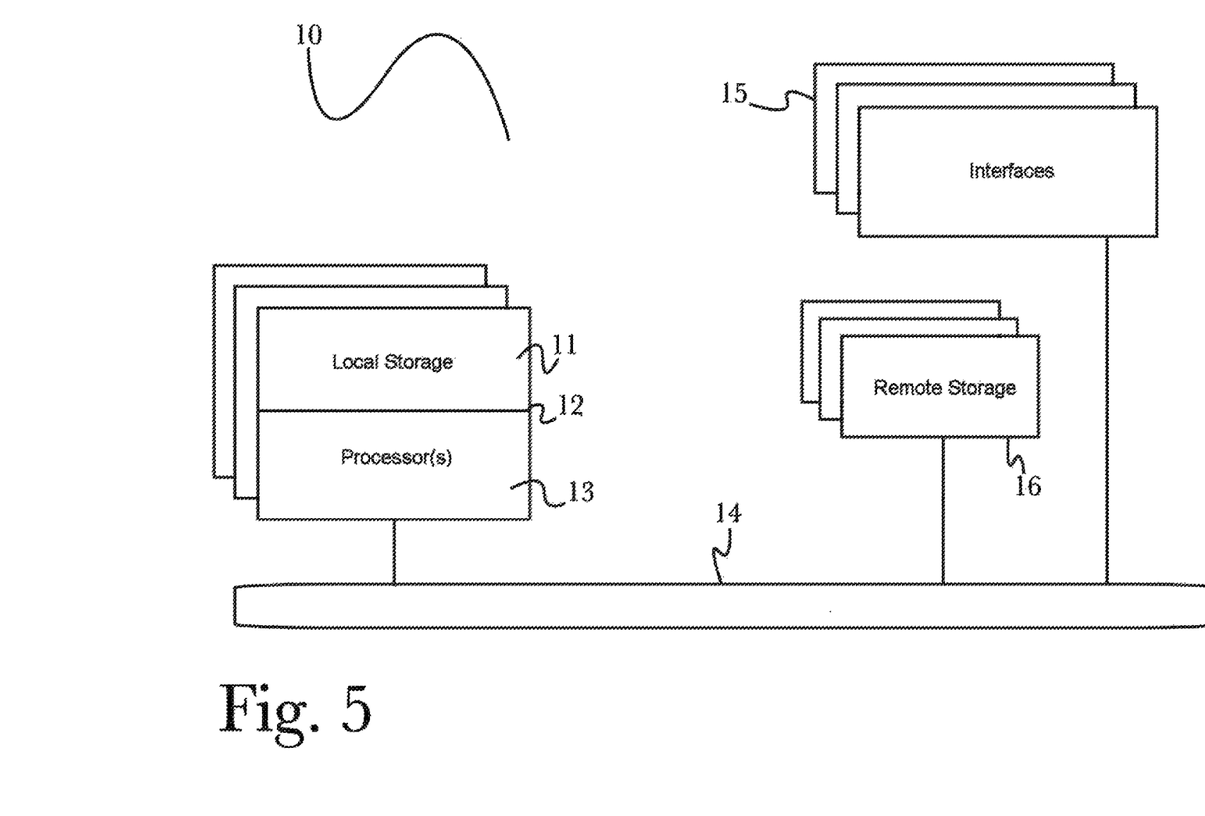
FIG. 5 is a block diagram illustrating an exemplary hardware architecture of a computing device used in an embodiment of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
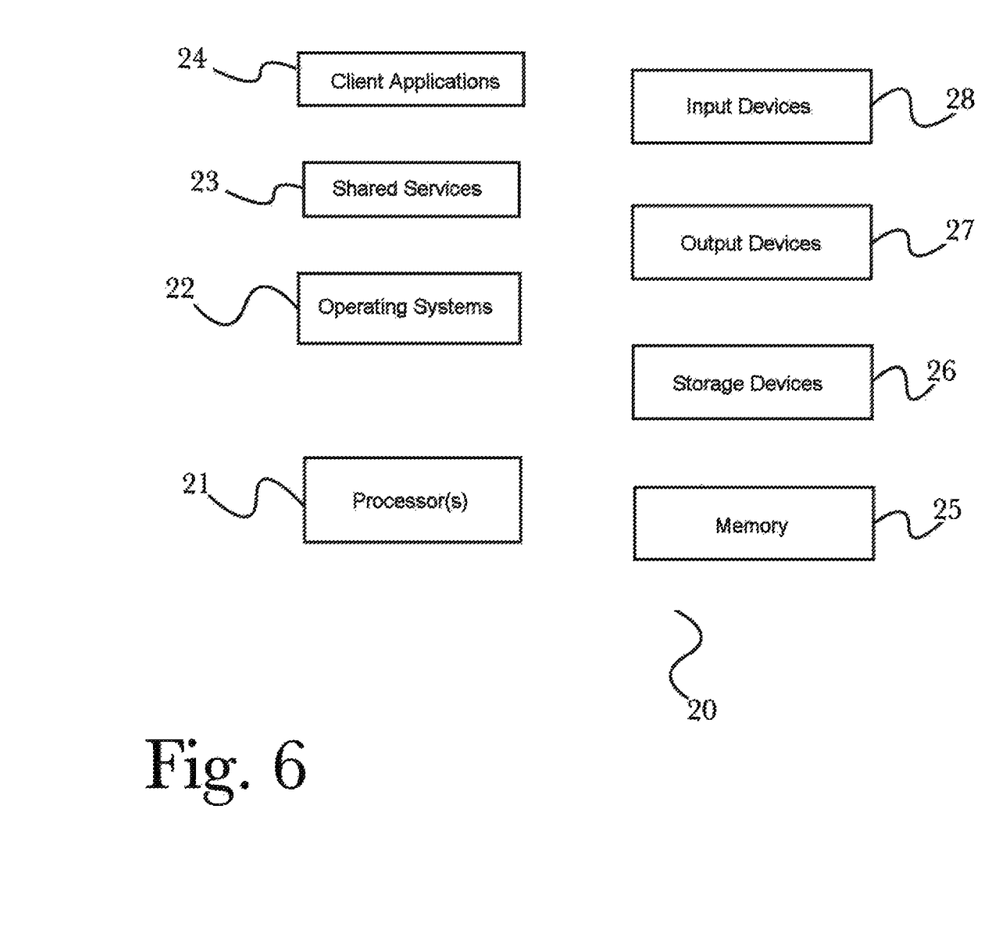
FIG. 6 is a block diagram illustrating an exemplary logical architecture for a client device, according to an embodiment of the invention.

In some embodiments, systems according to the present invention may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
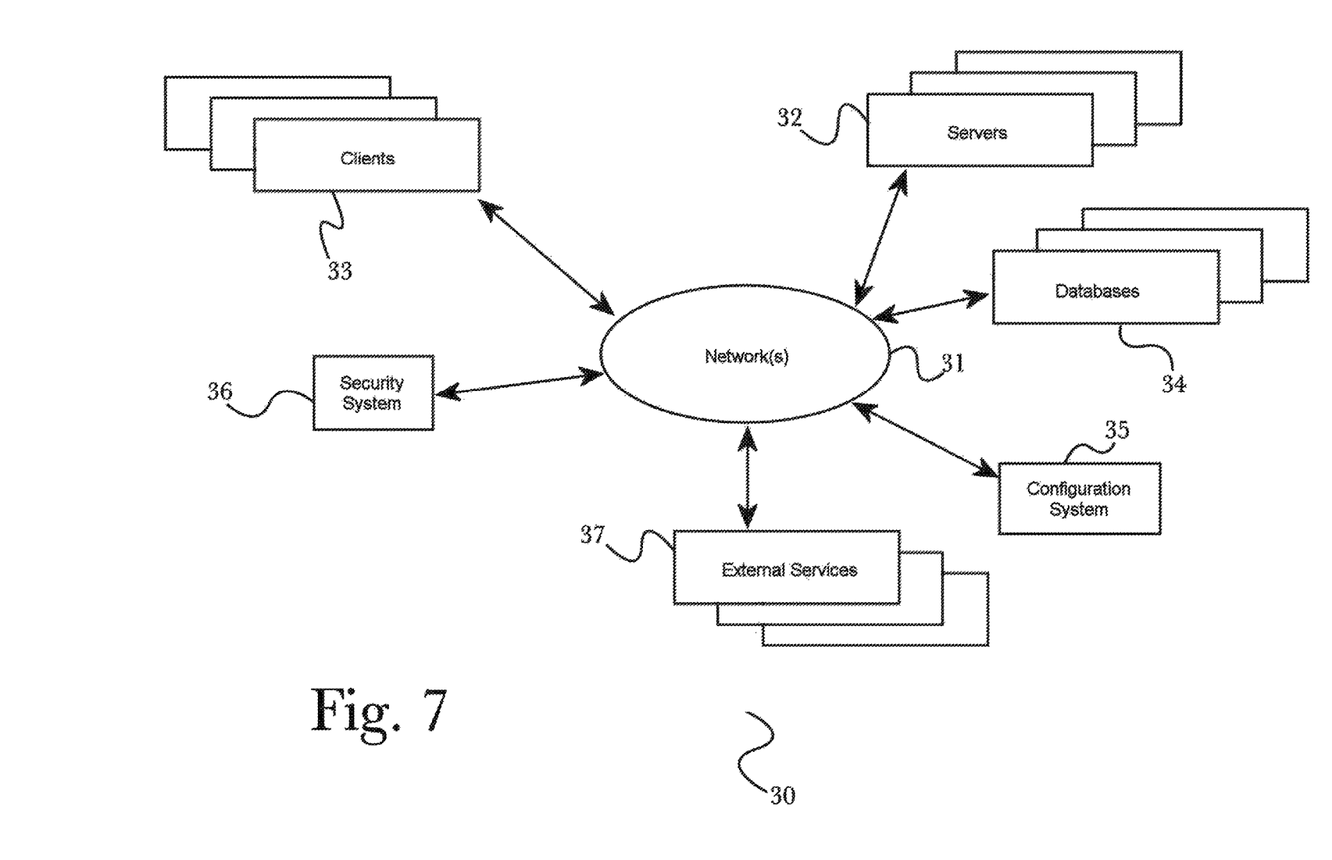
FIG. 7 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 7, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 6. In addition, any number of servers 32 may be provided for handling requests received from one or more clients 33.

Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 8:
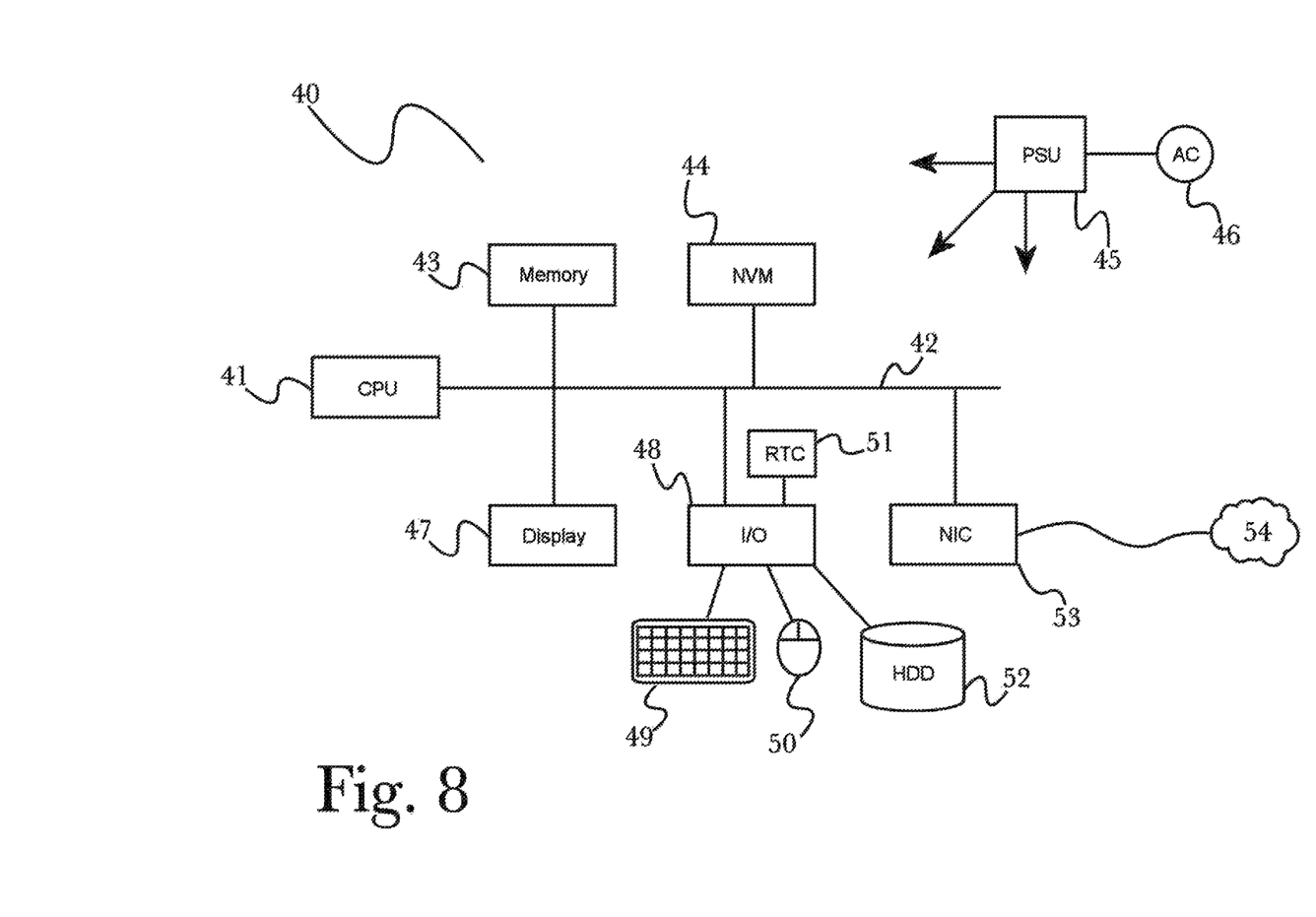
FIG. 8 is another block diagram illustrating an exemplary hardware architecture of a computing device used in various embodiments of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for day-level service level agreement-based routing, comprising:
    a statistics server computer comprising at least a processor, a memory, and a plurality of programming instructions stored in its memory and operating on its processor and configured to receive event data regarding interactions received at a contact center and to provide day-level service level compliance data for each of a plurality of interaction types based on the received event data; and
    a routing server computer comprising at least a processor, a memory, and a plurality of programming instructions stored in its memory and operating on its processor and configured to:
    receive an interaction via a network;
    determine an interaction type for the interaction;
    retrieve day-level service level agreement compliance data for each interaction type from the statistics server;
    establish a priority for the interaction at least by comparing the day-level service agreement compliance data for the determined interaction type to the day-level service agreement compliance data for each interaction type from the plurality of interaction types other than the determined interaction type; and route the interaction based at least in part on the established priority for the interaction;

wherein the day-level service compliance data for a specific interaction type is determined by:

determining whether a number of interactions of the specific interaction meets a type threshold; and if the type threshold is met, computing, on a per-day or per-shift basis, a percentage of interactions of the specific interaction type that have been answered within a specific time limit.

2. The system of claim 1, wherein the service level agreement compliance data further comprises an interaction count threshold, the interaction count threshold comprising at least a quantity of interactions of the interaction type required before considering the interaction type in day-level service level agreement routing decisions.

3. A method for day-level service level agreement-based routing, comprising the steps of:

receiving, at a routing server computer comprising at least a processor, a memory, and a plurality of programming instructions stored in its memory and operating on its processor, an interaction;

determining the interaction's type;

retrieving day-level service level agreement compliance data for each interaction type from a statistics server computer comprising at least a processor, a memory, and a plurality of programming instructions stored in its memory and operating on its processor and configured to receive event data regarding interactions received at a contact center and to provide day-level service level compliance data for each of a plurality of interaction types based on the received event data;

establishing a priority for the interaction at least by comparing the day-level service agreement compliance data for the determined interaction type to the day-level service agreement compliance data for each interaction type from the plurality of interaction types other than the determined interaction type; and routing the interaction based at least in part on the established priority for the interaction;

wherein the day-level service compliance data for a specific interaction type is determined by:

determining whether a number of interactions of the specific interaction meets a type threshold; and if the type threshold is met, computing, on a per-day or per-shift basis, a percentage of interactions of the specific interaction type that have been answered within a specific time limit.

4. The method of claim 3, wherein the service level agreement compliance data further comprises an interaction count threshold, the interaction count threshold comprising at least a quantity of interactions of the interaction type required before considering the interaction type in day-level service level agreement routing decisions.

* * * * *